Aug. 1, 1967    J. M. CROFT ET AL    3,333,724
QUICK CHANGE PLUG
Filed Jan. 18, 1966

INVENTORS.
*Joseph M. Croft*
*Ronald M. Messina*

United States Patent Office 3,333,724
Patented Aug. 1, 1967

3,333,724
QUICK CHANGE PLUG
Joseph M. Croft, St. Augustine, Fla. (Rte. 1, Box A3, Orange Park, Fla. 32073), and Ronald M. Messina, 455 Arricola, St. Augustine, Fla. 32084
Filed Jan. 18, 1966, Ser. No. 521,396
1 Claim. (Cl. 220—24.5)

This invention relates to devices for closing cylindrical openings in the engine, and more particularly a quick change plug.

It is therefore the main purpose of this invention to provide a quick change plug which is considerably easier to replace than the conventional plugs.

Another object of this invention is to provide a quick change plug which is provided with a wedge member for greater liquid-tight closure of a cylindrical hole in an engine block than has been possible. Another object of this invention is to provide a quick change plug which can be easier removed from the engine block than the plugs known in the prior art.

Still another object of this invention is to provide a quick change plug which is of rigid construction, can be cheaply manufactured and provides maximum utility to its user.

Figure 1:
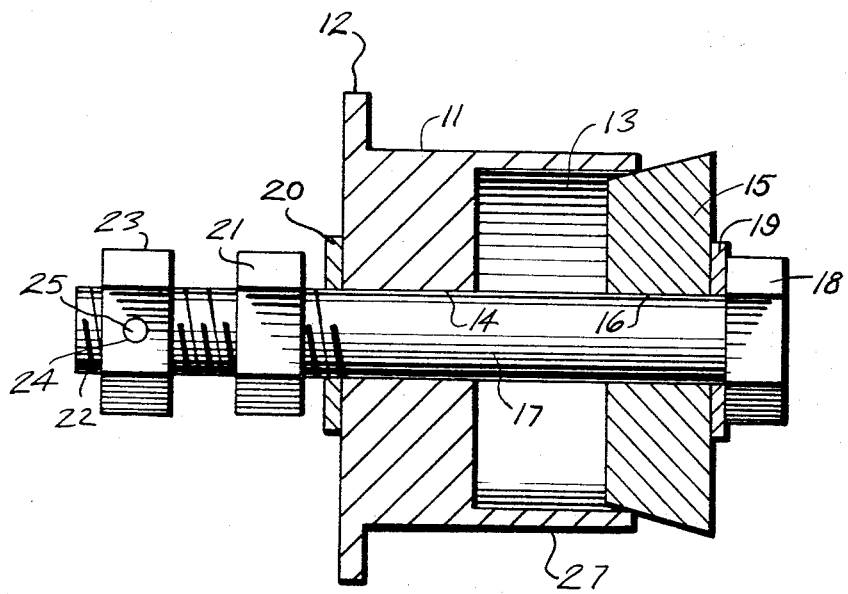
FIGURE 1 is a cross-sectional view taken along the lines 1—1 of FIGURE 2 and viewed in the direction indicated by the arrows.
Figure 2:
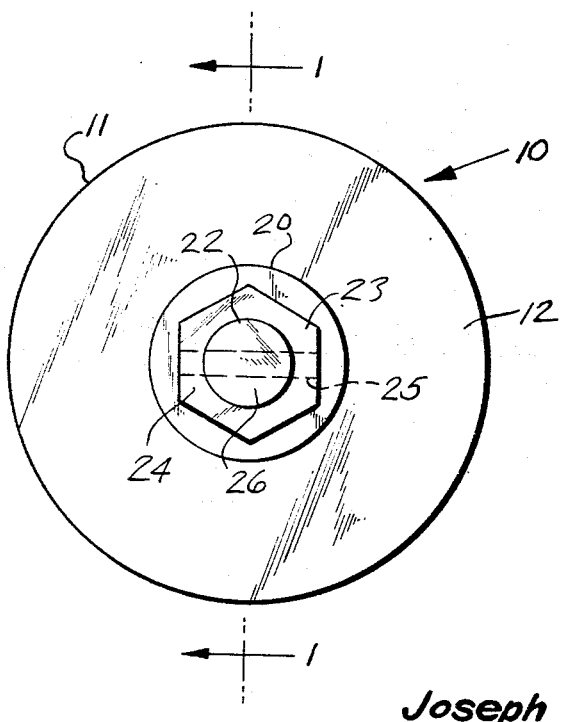
FIGURE 2 is an end view of FIGURE 1.

According to this invention, a quick change metallic plug 10 is provided with a substantially cylindrical plug body 11. One end of said body 11 is provided with a circular outer flange 12, the other end of said body 11 shows a cylindrical hollow portion 13. Hole 14 is centrally positioned within body 11. Wedge member 15 having a central hole 16 is adapted to be partially inserted into the hollow portion 13 of body 11. Bolt 17 protrudes through wedge member 15 and cylindrical plug body 11 in such a manner that bolt head 18 is adapted to rest on washer 19 which communicates with wedge member 15. After insertion of bolt 17 through washer 19, wedge member 15, plug body 11 and washer 20, bolt 17 is tightened by means of nut 21 which is communicating with the threaded portion 22 of bolt 17. For additional tightness threaded portion 22 is provided with hole 26 which is adapted to admit a pin 25 inserted through holes 24 of the nut 23.

In operation, quick change plug 10 is inserted into a hole (not shown) of an engine block. By tightening nut 21 wedge member 15 is pushed inwardly into the cylindrical hollow portion 13 thereby slightly expanding side walls 27 for tighter closure of the hole within said engine block. Once nut 21 is sufficiently tightened holding nut 23 is adapted to secure nut 21 in place by means of a pin 25.

It will also be noted that quick change plug shown in FIGURE 1 of the drawing is illustrated as an example only, since there may be numerous modifications made without deviating from the scope of the present invention.

What we now claim is:

A quick change plug comprising, in combination, a substantially cylindrical plug body having a circular flange at its end portion and being adapted to provide guiding means when said plug body is positioned within the circular opening of an engine block, said plug body having a hole and a cylindrical hollow portion of greater diameter than said hole, both cylindrical hollow portion and said hole operably cooperate an concentric plane, a substantially circular wedge member having a hole therein, a bolt adapted to be secured within said holes of said wedge member and said plug body for urging a portion of said wedge member into said hollow portion of said plug body thereby slightly expanding the circular holes of said plug body, said bolt being provided with a threaded portion and a laterally disposed hole within said portion, a washer on the other end of said bolt which bolt being provided with a bolt head, said bolt head being adapted to rest on another washer being positioned between said wedge member and said bolt head, a first nut for securing said bolt within said body portion being disposed on said threaded portion of said bolt, said first nut being arranged for securing said bolt within said body portion, and a second nut having a laterally disposed hole therein for admitting a pin adapted to be positioned within said hole of said first nut in alignment with said lateral hole of said bolt, said second nut being adapted to secure said first nut on said bolt.

References Cited

UNITED STATES PATENTS

| 686,387 | 11/1901 | Cogswell | 220—24.5 |
| 1,059,053 | 4/1913 | Lennon | 220—24.5 |

FOREIGN PATENTS

| 545,645 | 3/1932 | Germany. |

THERON E. CONDON, Primary Examiner.
JAMES B. MARBERT, Examiner.